Dec. 29, 1964  C. V. WATSON  3,162,899
SYSTEM FOR THE MANUFACTURE OF DIAPHRAGMS
Filed April 6, 1961  4 Sheets-Sheet 1

INVENTOR
C. VERNON WATSON
BY Fisher, Christen & Goodson
ATTORNEYS

Dec. 29, 1964   C. V. WATSON   3,162,899
SYSTEM FOR THE MANUFACTURE OF DIAPHRAGMS
Filed April 6, 1961   4 Sheets-Sheet 2

INVENTOR
C. VERNON WATSON

BY Fisher, Christen & Goodson

ATTORNEYS

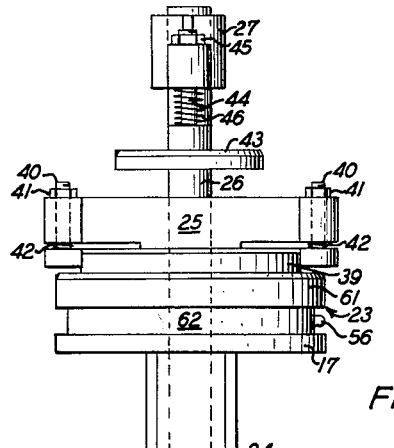
FIG. 3
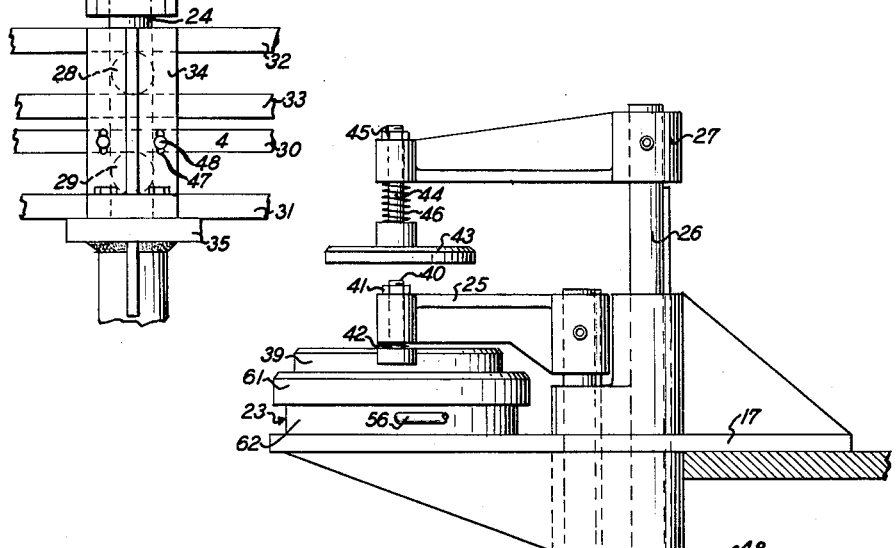
FIG. 4
INVENTOR
C. VERNON WATSON
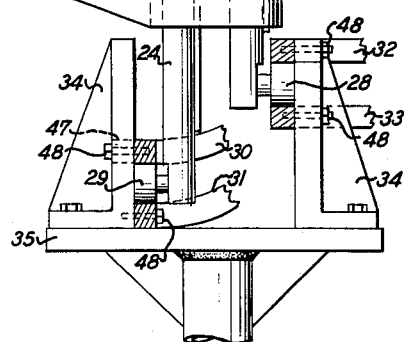
ATTORNEYS

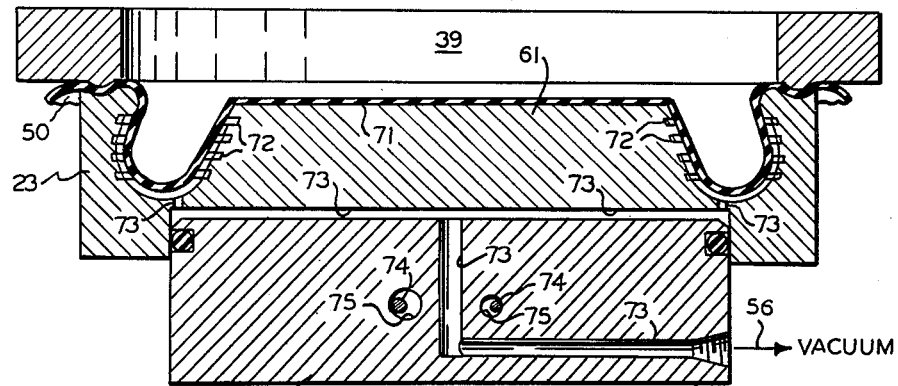
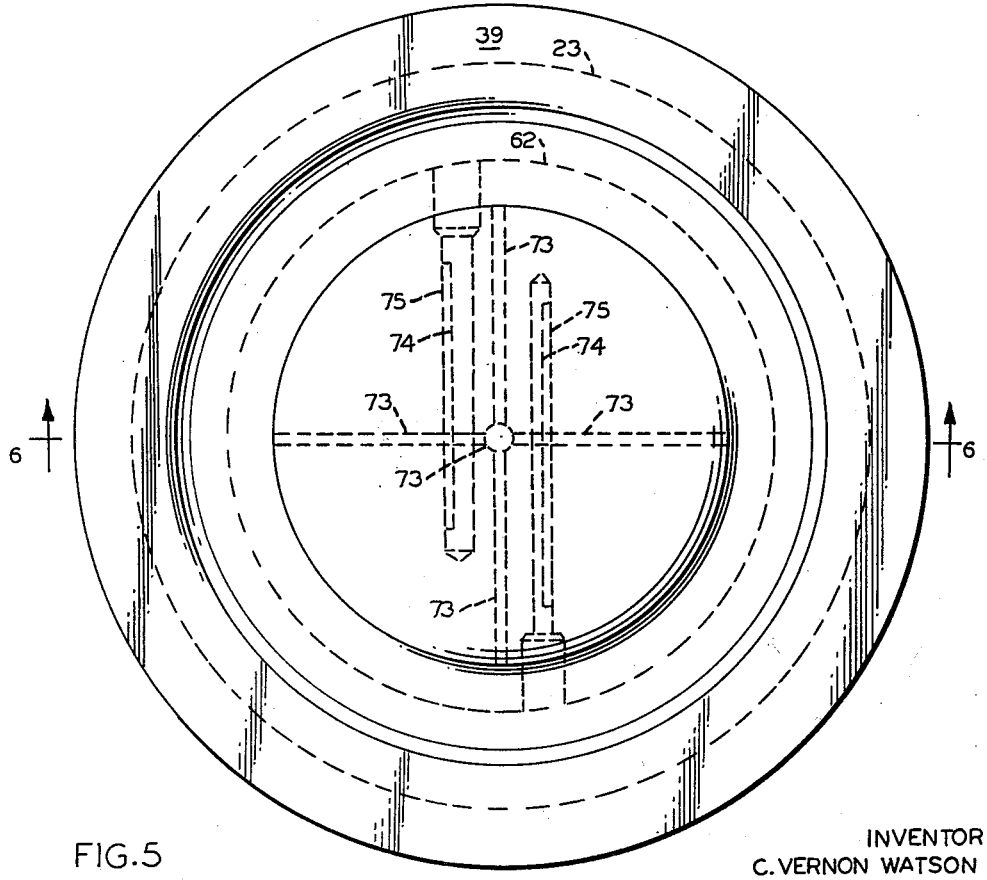

United States Patent Office 3,162,899
Patented Dec. 29, 1964

3,162,899
SYSTEM FOR THE MANUFACTURE OF
DIAPHRAGMS
Charles Vernon Watson, Buena Vista, Va., assignor to
Reeves Brothers, Inc., New York, N.Y., a corporation
of New York
Filed Apr. 6, 1961, Ser. No. 101,172
7 Claims. (Cl. 18—19)

This invention relates to manufacturing precision molded articles and, more particularly, to the precise art of manufacturing, at high production rates, diaphragms employed in measuring and control instruments and equipment such as gas meters.

The manufacture of diaphragms for gas measuring equipment is highly precisional and specialized, requiring the highest possible degree of skill and reproducible accuracy. Each diaphragm must have a particular configuration and, whether they are circular, oval, square, rectangular, trapezoidal, cylindrical or otherwise shaped, they must be identical with each other diaphragm of the same type in order to be capable of providing the same, consistently accurate, measurements when installed in measuring or control apparatus. For example, when the diaphragms are circular they must have identical radial cross-sections in all directions in order to be reliable. Any flaws or differences in the radial cross-sections give rise to unpredictable resistances to the proper flexure of the diaphragm resulting in inconsistent movements thereof and unpredictable measurements. In some cases, such inconsistencies can be corrected but, in many cases, no correction is possible.

Diaphragms for gas meters and other fluid measuring equipment, previously, were made by skilled artisans using hand techniques in order to obtain reasonably reproducible accuracy required by users of measuring equipment. These prior manufacturing methods, of necessity, were time-consuming, requiring several hours for the production of a diaphragm.

It is therefore a primary object of this invention to provide an apparatus for manufacturing precision diaphragms each diaphragm being of substantially the same characteristics as each other made by the same process and apparatus.

A further object is the provision of a system, process and apparatus for the precision manufacture of large quantities of accurately molded meter diaphragms at a high rate and with the least amount of manual labor.

A further object is the provision of a system and apparatus for manufacturing many types of meter diaphragms having the above characteristics.

A still further object is to provide a system and apparatus which are interchangeable for, and readily adapted to, making any one of several types of diaphragms having the above characteristics.

Further objects and advantages of this invention will be apparent from the following detailed description of several embodiments thereof described in conjunction with the attached drawings, of which:

FIG. 3 is a front elevation in cut-away of one station of said turret molding apparatus;

FIG. 4 is a side elevation of said station shown in FIG. 3;

FIG. 5 is a plan view of one type of vacuum mold employed in the apparatus shown in the previous figures; and FIG. 6 is a cross section taken on line 6—6 of FIG. 5.

My co-pending application Serial No. 107,280 filed March 14, 1961, discloses a novel method and apparatus for manufacturing large quantities of precisely shaped and weighted diaphragms and diaphragm assemblies, each being of substantially the same characteristics as each other made by the same process and apparatus. There are also disclosed therein vacuum-molding techniques and several types of vacuum molds and associated pressure rings and retaining rings for making a variety of diaphragms and assemblies including conventional diaphragms and assemblies theretofore known and used, and novel diaphragms and diaphragm assemblies unknown and not used prior to my invention thereof. The system, apparatus and process of my co-pending application additionally provide huge savings in manual labor, and drastically curtail the time needed for making diaphragms and assemblies.

The present invention utilizes the techniques, apparatus, and methods disclosed in the above-mentioned application to provide a novel system and machine for the substantially automatic, mass production of a wide variety of diaphragms and diaphragm assemblies. In a broad aspect, this invention provides a vacuum-molding machine comprising a turret adapted for rotation; a plurality of vacuum-molding assemblies, arranged on said turret around its axis of rotation, each assembly comprising a suction mold having an upwardly disposed mold face and conduit means for transmitting suction to various points on said mold face; releasable clamping or retaining means for releasably sealing a sheet of curable, yieldable, impermeable diaphragm membrane blank over said mold face at a predetermined station; means for applying suction to said mold at a subsequent predetermined station thereby forming said blank into the desired diaphragm shape; means for releasing the suction and the clamping means at a still subsequent predetermined station after the blank has been cured into the desired diaphragm shape; and heating means for timely maintaining the mold face at the desired curing temperature. Suitable pressure means can also be provided for pressing various diaphragm assembly parts and components on the blank or for assisting the formation of the desired diaphragm shape at a predetermined station after application of suction. By the practice of this invention, it is now possible to manufacture superior gas meter diaphragms in a small fraction of the time previously required.

Figure 1:
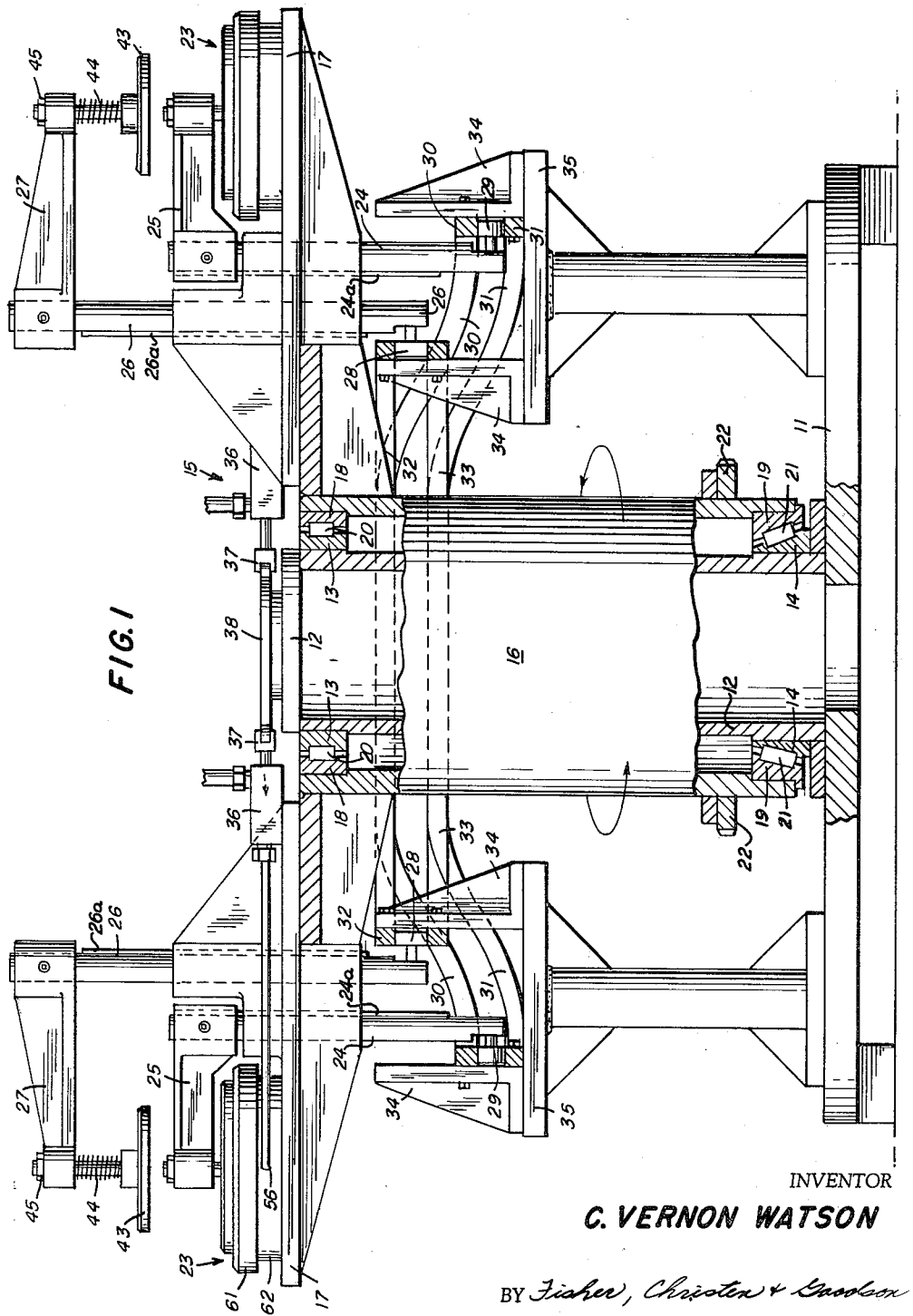
FIG. 1 is an elevation, partly in diametrical cross-section, of a turret molding apparatus embodying this invention.
Figure 2:
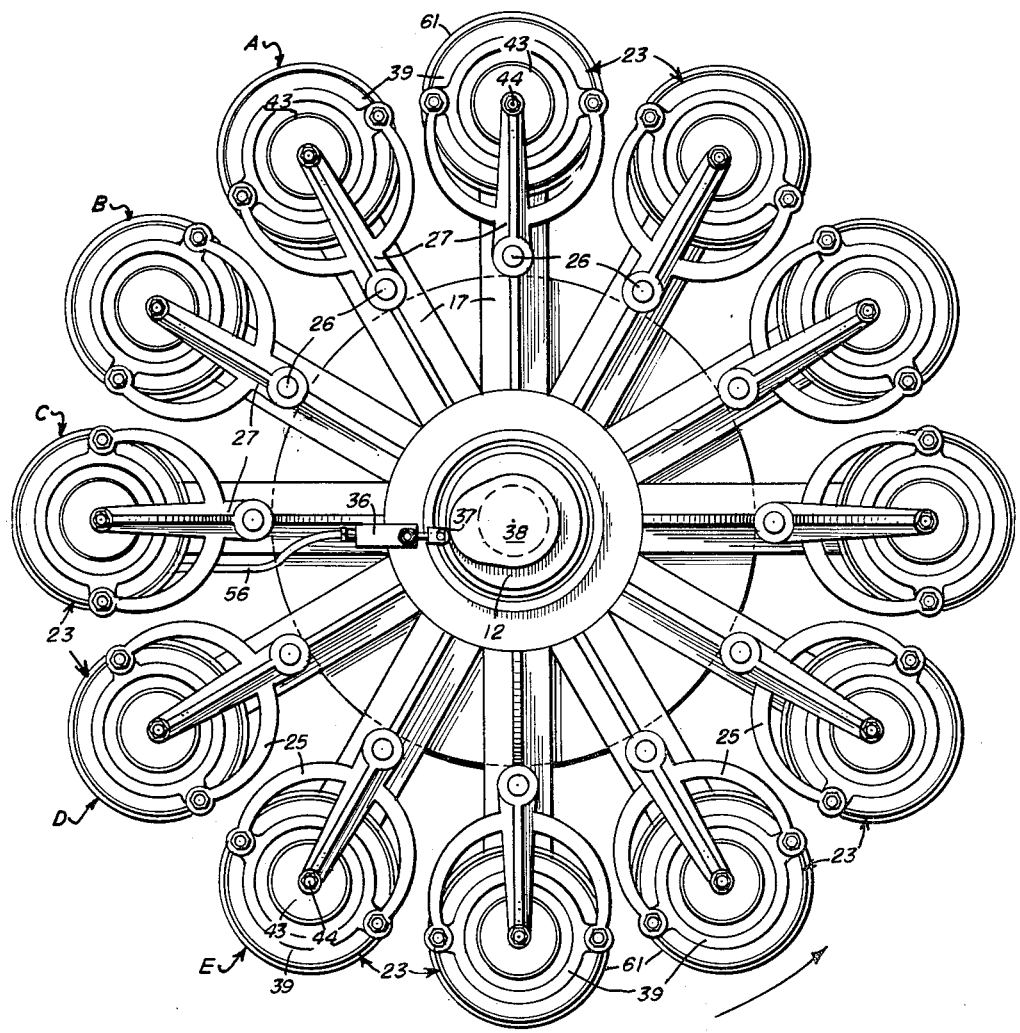
FIG. 2 is a plan view of said turret molding apparatus.

Referring now to FIGS. 1 and 2, there is shown a base 11 having a central post 12 vertically mounted thereon. Annular bearing surfaces 13 and 14 are respectively mounted on the upper and lower portions, respectively, of the central post 12. There is also provided a turntable 15 comprising a hollow shaft 16 and spokes or arms 17 attached to the upper end thereof and extending radially outwardly therefrom. The hollow shaft 16 is provided with annular bearing surfaces 18 and 19 internally mounted on the upper and lower portions, respectively, thereof. The internal diameter of the hollow shaft 16 is larger than the external diameter of central post 12 such that the hollow shaft 16 fits concentrically around the central post and the respective bearing surfaces 13 and 18 and 14 and 19 are in alignment for cooperative engagement with roller bearings 20 and 21, respectively, interposed between the respective pairs of said annular bearing surfaces. This arrangement permits the rotation of hollow shaft 16 and turntable 15 about the fixed central post 12. The hollow shaft 16 is also provided on its external surface with an annular gear 22 which engages a suitable drive mechanism (not shown) which drivably connects the hollow shaft to an electric motor or other source of power for rotating said shaft.

Each spoke or arm 17 has mounted on its outward end a vacuum mold 23, more specifically described in my above-mentioned co-pending application. Each vacuum mold 23 is suitably connected to a vacuum supply (not shown) and also to a source of heated oil (not shown).

Inwardly from each vacuum mold 23 there is slidably mounted a first cam rod 24 formed with a key 24a having attached to its upper end a yoke 25 which extends outwardly over said vacuum mold 23. A second cam rod 26 formed with a key 26a is slidably mounted on each arm inwardly from the first cam rod 24. To the upper end of each second cam rod 26 is attached an arm 27 which extends outwardly over each vacuum mold 23. At the lower ends of the first cam rod 24 and the second cam rod 26 are rotatably mounted cam following wheels respectively 27 and 28. The cam following wheel 29 engages and follows a pair of continuous cam bars 30 and 31 arranged circularly and concentrically around the hollow shaft 16. The continuous cam bar 30 engages and guides the upper portion of the following wheel 29 and the continuous cam bar 31 engages and guides the lower portion of the following wheel 29, thus controlling the up-and-down movement of said wheel 29 and its cam rod 24. Similarly, the following wheel 28 mounted at the lower end of the second cam rod 26 engages and follows a second pair of continuous cam bars 32 and 33, which extend circularly and concentrically around the hollow shaft 16. The continuous cam bar 32 guides the upper portion of the following wheel 28 and the continuous cam bar 33 guides the lower portion of the following wheel 28, thus controlling the up-and-down movement of said wheel 28 and its cam bar 26. The keys 24a and 26a respectively cooperate with keyways 24b and 26b in each arm 17 to prevent rotation of the respective cam rods 24 and 26 about their respective longitudinal axes.

The continuous cam bar pairs 30 and 31, and 32 and 33 are suitably mounted on brackets 34 which, in turn, are mounted on pedestals 35 which, in turn, are mounted on the base 11 below the spokes or arms 17. The continuous cam bar pairs 30 and 31, and 32 and 33, respectively, provide for the raising and lowering of the first cam rod 24 and the second cam rod 26 at preselected stations about the circumference of the turntable 15, and, thus, are in their highest position when their respective cam rods are to be at their uppermost or raised position and in their lowest position when the respective cam rods are to be at their lowermost or closed position.

A vacuum valve 36 is mounted on each spoke or arm 17 inwardly from the second cam rod 26. This vacuum valve 36 is interposed in the supply line from a vacuum source (not shown) to the vacuum mold 23 and is actuated through a cam following switch arm 37 which engages a stationary cam 38 mounted on the upper end of the central post 12. The cam 38 is so shaped as to supply vacuum to the vacuum mold 23 at predetermined stations about the circumference of the turntable 15 (the high portion of said cam) and to shut off vacuum from the vacuum source and vent (release vacuum from) the vacuum mold 23 at other predetermined stations (the low portion of said cam). For simplicity only one vacuum valve 36 is shown in FIG. 2; however, each vacuum mold 23 has its individual associated vacuum valve 36 mounted on each spoke or arm 17. As shown in FIG. 2, the vacuum mold at position A is about to receive vacuum, the vacuum mold at positions B, C and D are receiving vacuum and the vacuum to the vacuum mold at position E is being cut off and the mold is being vented. The vacuum molds at the remaining positions are not receiving vacuum and are vented. Several high portions can be provided to cam 38 in order to permit the performance of several molding cycles during one complete revolution of the turntable 15.

As best shown in FIGS. 3 and 4, the arms of the yoke 25 extend outwardly above the vacuum mold 23, and, at diametrically opposed points above the periphery of the vacuum mold 23, slidably mount a retaining ring 39 by means of pins 40 and nuts 41. A compression spring 42 is interposed on the pin 40 between the retaining ring 39 and the arms of the yoke 25. A sufficient tolerance is provided the pin 40 and the arm of the yoke 25 so as to permit the proper alignment of the retaining ring 39 with the top of the vacuum mold 23, when said retaining ring is lowered into contact with said mold.

Referring again to FIGS. 3 and 4, the arm 27 slidably mounts a pressure pad 43 concentrically over the vacuum mold 23 by means of a pin 44 and nut 45. A compression spring 46 is interposed around the pin 44 between the arm 27 and the pressure pad 43 and sufficient tolerance is provided between the pin 44 and the arm 27 to permit the proper alignment of the pressure pad 43 with respect to the upper face of the vacuum mold 23, when said pad is lowered into contact with said mold.

It will be noted that fine adjustments can be made to the pressure pad 43 by turning the nut 45 to vary the height of said pressure pad over the vacuum mold 23 as desired. The retaining ring 39 can also be adjusted to vary the height of said ring over said mold and/or to provide fine alignment with the vacuum mold 23 by turning one or both of nuts 41 to raise, or lower, one, or both, sides of said retaining ring as desired.

In order to provide for slight adjustments to the vertical position of the continuous bars 32 and 33, or 30 and 31, the bracket 34 is slotted at the point of attachment of said continuous cam bars thereto as shown at 47. The continuous cam bars are attached to the bracket 34 by means of bolts 48 passing through the slots 47 and thus may be raised or lowered as desired by loosening the bolts 48 and sliding upwardly or downwardly as desired in the slots 47.

In its lowered position the retaining ring 39 contacts a diaphragm blank overlying the mold face of the vacuum mold 23 to seal said blank to said mold face such that applied vacuum is contained between said blank and mold face. The pressure pad or ring 43 (if employed) in its lowered position is used to press the various components of a diaphragm assembly into adhesive contact with the diaphragm blank. For example, a pressure ring 43 is used to press a gasket into adhesive contact with peripheral areas of the diaphragm blank, or a pressure pad or ring 43 is employed to press the lip of a diaphragm pan into adhesive contact with peripheral portions of the blank. When lowered the pressure pad 43, if desired, in another embodiment is adapted to apply pressure (mechanical or gaseous) to the upper surface of the diaphragm blank for assisting in the formation of said blank into the desired diaphragm shape, as described in detail in my aforesaid co-pending application.

A detailed description of various novel vacuum molds 23 which can be employed herein is provided in my above-mentioned patent application. As disclosed therein and shown in FIGS. 5 and 6 herein, the vacuum mold 23 is comprised of a lower piece 62 and an upper piece 61 having an upper face 71 defining the shape of the desired diaphragm or diaphragm assembly, a series of fine vacuum distributing grooves 72 in said upper face and internal vacuum branch lines 73 connecting said grooves to an external fixture on the mold for connection to a vacuum source a diaphragm blank 50 is shown overlying the upper face 71. The mold can be provided with heating means, e.g., an electrical heating element 74 inserted in suitable bores 75 in the body of the mold. Other suitable heating means can be employed, however, e.g., by circulating heated oil through canals in the mold body, by radiant heat, by high frequency means, etc., associated with the mold.

Referring now to FIGS. 1, 2, 3 and 4, the operation of the molding system shown therein and described hereinabove will now be described in detail. The vacuum molds 23 which will provide the desired molded diaphragm assembly are placed in their positions on the outward end portions of the spokes or arms 17, and their associated retaining rings 39 are suitably mounted on the yokes 25 as hereinabove described. The continuous cam bar pairs 30 and 31, and 32 and 33 are arranged to provide the desired molding cycle. In this connection, a typical molding cycle would consist of the following sequence:

(1) With the pressure pad or ring 43 and retaining ring 39, in raised position above the vacuum mold 23, and vacuum valve 36 in the off position such that no vacuum is being applied, the diaphragm blank and diaphragm assembly parts, e.g., center disc, gasket and/or diaphragm pan are inserted in the proper sequence.

(2) The retaining ring 39 is lowered to force the diaphragm blank into vacuum-sealing engagement with the upper surface of the mold 23.

(3) The vacuum valve 36 is actuated, and vacuum is applied and maintained for a sufficient length of travel of the turntable to permit curing or setting of the diaphragm blank and adhesive on the center disc, if used. After the diapragm blank has been drawn into the mold, the pressure pad or ring is lowered to force the diaphragm blank and the gasket or lip of the diaphragm pan into pressure engagement and is maintained there until the adhesive on the gasket or lip has set.

(4) The vacuum valve 36 is then turned off, releasing the vacuum in the mold.

(5) The pressure pad or ring 43 and retaining ring 39 are raised.

Thus, the continuous cam bars 30 and 31 are in their lowest position at the station where retaining ring 39 is to be in its lowered position and said continuous cam bars are in their uppermost position at a station where said retaining ring is to be in its uppermost, rest position. Similarly, continuous cam bars 32 and 33 are in their lowest position when pressure pad or ring 43 is to be in its lowered position engaging the diaphragm blank, diaphragm pan or gasket and said continuous cam bars are in the uppermost position when said pressure pad is in the raised, rest position. The shape and disposition of stationary cam 38 is also such that the vacuum valve switch arm 37 is displaced to open vaccum valve 36 at stations where vacuum is to be applied and is displaced to close vacuum valve 36 where vacuum to the vacuum mold 23 is to be turned off.

A source of power, for example, an electric motor, transmits rotating power to the turntable through annular gear 22 on the hollow shaft 16. As a particular spoke or arm 17 reaches a specific station, the continuous cam bar pairs 30 and 31, cam bar pairs 32 and 33 and the stationary cam 38 provide the appropriate disposition of, respectively, the retaining ring 39, the pressure pad 43 and the vacuum valve 36. At the station where the retaining ring 39 and pressure pad 43 are in their uppermost positions and the vacuum valve 36 is in its off position just preceding the station where said retaining ring and said pressure pad are lowered, an operator can be positioned to insert the necessary diaphragm assembly parts such as the diaphragm blank, center disc, gasket and/or pan. The number of arms or spokes 17 can be adjusted so that the same operator removes the molded diaphragm in addition to feeding diaphragm parts to be assembled and molded. Alternatively, the number of arms or spokes 17 and thus the number of vacuum molds 23 can be adjusted such that a complete cycle of molding does not consume one entire revolution of the turntable 15, to the end that one or more operators can feed the diaphragm parts while removing molded, assembled diaphragms. For example, operators can be placed at diametrically opposite sides of the turntable 15 and one-half revolution of said turntable can accomplish one entire molding sequence. Thus, operator 1 removes molded and assembled diaphragms, which parts were fed by operator 2, and vice versa. Depending on the number of spokes or arm 17 and vacuum molds 23, more than two operators can be employed.

It is preferable to maintain the vacuum mold at a suitably high temperature for curing the diaphragm blank in the mold. However, if desired, the temperature can be varied somewhat by switching means wherein the mold will be heated while vacuum is being applied and the heat turned off when no vacuum is being applied. In any event, it is sufficient to maintain the mold 23 at the necessary high temperature by continuously heating said mold, for example, by electrical means or by circulating oil. The vacuum source necessary for applying vacuum to the mold can be readily mounted on the turntable 15 and thus avoid complicated vacuum connections from a vacuum source located in a stationary position off of said turntable. Similarly, a compressed air supply and/or a source of heated oil for heating the vacuum mold, if such are employed, can also be mounted on the turntable 15 to avoid complicated moving connections.

While in accordance with the provisions of the statutes, I have illustrated and described herein a specific form of the invention now known to me, those skilled in the art will understand that changes may be made in the form of the apparatus disclosed without departing from the spirit of the invention covered by my claims and that certain features of the invention may sometimes be used to advantage without a corresponding use of the other features.

What is claimed is:

1. A system for the precision molding of diaphragms from a sheet of curable, yieldable, impermeable diaphragm membrane material, comprising a turret rotatable on a vertical axis, means for rotating said turret, a plurality of suction molds peripherally mounted on said turret, each suction mold having an upward mold face defining the shape of said diaphragm, said mold face being adapted to receive said sheet superimposed thereon, and said mold having conduit means for transmitting downward suction to various points on said face; a plurality of releasable clamping means, each of said suction molds being associated with one of said clamping means, each of said clamping means being positioned above its associated suction mold including means for moving said clamping means to a lowered position wherein it cooperates with portions of the face of its associated suction mold to releasably seal said sheet over said face at a predetermined station, said clamping means having a clamping surface for contacting said sheet and pressing same into sealing contact with said portions of said face, said clamping surface having substantially the same shape as said portions of said face; means for resiliently urging said clamping means when in its lowered position toward said face so as to resiliently urge a sheet overlying said face into sealing contact therewith and permit movement of said sheet disposed between said face and said clamping means; means for applying vacuum to said mold face through said conduit means when said mold reaches a subsequent predetermined station of turret rotation to hold said sheet in conformance with said mold face to form said diaphragm; means for releasing said vacuum and for releasing said clamping means at a still subsequent predetermined station after the diaphragm has been cured; and means for heating said mold to a temperature sufficient to cure said sheet.

2. A system for the precision molding of diaphragms from a sheet of curable, yieldable, impermeable diaphragm membrane material, comprising a turret rotatable on a vertical axis, means for rotating said turret, a plurality of suction molds peripherally mounted on said turret, each suction mold having an upward mold face defining the shape of said diaphragm, said mold face being adapted to receive said sheet superimposed thereon, and said mold having conduit means for transmitting downward suction to various points on said face; a plurality of releasable clamping means, each of said suction molds being associated with one of said clamping means, each of said clamping means being positioned above its associated suction mold including means for moving said clamping means to a lowered position wherein it cooperates with portions of the face of its associated suction mold to releasably seal said sheet over said face at a predetermined station, said clamping means having a clamping surface for contacting said sheet and pressing same into sealing contact with said portions of said face, said clamping surface having substantially the same shape as said portions of said face; means for resiliently urging said clamping means when in its lowered position toward said face so as to resiliently urge a sheet overlying said face into sealing contact therewith and permit movement of said sheet disposed between said face and said clamping means; means for applying vacuum to said mold face through said conduit means when said mold reaches a subsequent predetermined station of turret rotation to hold said sheet in conformance with said mold face to form said diaphragm; pressure means for pressure-contacting a gasket with the peripheral areas of said formed diaphragm at a subsequent station; means for releasing said vacuum and for releasing said clamping means at a still subsequent predetermined station after the diaphragm has been cured, and means for heating said mold to a temperature sufficient to cure said sheet.

3. A system for the precision molding of diaphragms from a sheet of curable, yieldable, impermeable diaphragm membrane material, comprising a turret rotatable on a vertical axis, means for rotating said turret, a plurality of suction molds peripherally mounted on said turret, each suction mold having an upward mold face defining the shape of said diaphragm and having conduit means for transmitting downward suction to various points on said face; a plurality of releasable clamping means, each of said suction molds being associated with one of said clamping means, each of said clamping means being positioned above its associated suction mold including means for moving said clamping means to a lowered position wherein it cooperates with portions of the face of its associated suction mold to releasably seal said sheet over said face at a predetermined station, said clamping means having a clamping surface for contacting said sheet and pressing same into sealing contact with said portions of said face, said clamping surface having substantially the same shape as said portions of said face; means for resiliently urging said clamping means when in its lowered position toward said face so as to resiliently urge a sheet overlying said face into sealing contact therewith and permit movement of said sheet disposed between said face and said clamping means; means for applying vacuum to said mold face through said conduit means when it reaches a subsequent predetermined station of turret rotation to form said diaphragm; pressure means for pressure-contacting the lip of a diaphragm pan with the peripheral areas of said formed diaphragm at a subsequent station; means for releasing said vacuum and for releasing said clamping means at a still subsequent predetermined station after the diaphragm has been cured; and means for heating said mold to a temperature sufficient to cure said sheets.

4. A system for the precision molding of diaphragms from a sheet of curable, yieldable, impermeable diaphragm membrane material, comprising a turret rotatable on a vertical axis, means for rotating said turret, a plurality of suction molds peripherally mounted on said turret, each suction mold having an upward mold face defining the shape of said diaphragm and having conduit means for transmitting downward suction to various points on said face; a plurality of releasable clamping means, each of said suction molds being associated with one of said clamping means, each of said clamping means being positioned above its associated suction mold including means for moving said clamping means to a lowered position wherein it cooperates with portions of the face of its associated suction mold to releasably seal said sheet over said face at a predetermined station, said clamping means having a clamping surface for contacting said sheet and pressing same into sealing contact with said portions of said face, said clamping surface having substantially the same shape as said portions of said face; means for resiliently urging said clamping means when in its lowered position toward said face so as to resiliently urge a sheet overlying said face into sealing contact therewith and permit movement of said sheet disposed between said face and said clamping means; means for applying vacuum to said mold face through said conduit means when it reaches a subsequent predetermined station of turret rotation to form said diaphragm; means for applying super-atmospheric pressure toward said mold face after application of vacuum; means for releasing said vacuum and for releasing said clamping means at a still subsequent predetermined station after the diaphragm has been cured; and means for heating said mold to a temperature sufficient to cure said sheet.

5. A system for the precision molding of diaphragms from a sheet of curable, yieldable, impermeable diaphragm membrane material, comprising a turret rotatable on a vertical axis, means for rotating said turret, a plurality of suction molds peripherally mounted on said turret, each suction mold having an upward mold face defining the shape of said diaphragm and having conduit means for transmitting downward suction to various points on said face; a plurality of releasable clamping means, each of said suction molds being associated with one of said clamping means, each of said clamping means being positioned above its associated suction mold including means for moving said clamping means to a lowered position wherein it cooperates with portions of the face of its associated suction mold to releasably seal said sheet over said face at a predetermined station, said clamping means having a clamping surface for contacting said sheet and pressing same into sealing contact with said portions of said face, said clamping surface having substantially the same shape as said portions of said face; means for resiliently urging said clamping means when in its lowered position toward said face so as to resiliently urge a sheet overlying said face into sealing contact therewith and permit movement of said sheet disposed between said face and said clamping means; means for applying vacuum to said mold face through said conduit means when it reaches a subsequent predetermined station of turret rotation to form said diaphragm; pressure means over said mold face for augmenting the forming of said diaphragm after the application of vacuum; means for releasing said vacuum and for releasing said clamping means at a still subsequent predetermined station after the diaphragm has been cured; and means for heating said mold to a temperature sufficient to cure said sheet.

6. A system for the precision molding of diaphragms from a sheet of curable, yieldable, impermeable diaphragm membrane material, comprising a turret rotatable on a vertical axis, means for rotating said turret, a plurality of suction molds peripherally mounted on said turret, each suction mold having an upward mold face defining the shape of said diaphragm and having conduit means for transmitting downward suction to various points on said face; a plurality of releasable clamping means, each of said suction molds being associated with one of said clamping means, each of said clamping means being positioned above its associated suction mold including means for moving said clamping means to a lowered position wherein it cooperates with portions of the face of its associated suction mold to releasably seal said sheet over said face at a predetermined station, said clamping means having a clamping surface for contacting said sheet and pressing same into sealing contact with said portions of said face, said clamping surface having substantially the same shape as said portions of said face; means for resiliently urging said clamping means when in its lowered position toward said face so as to resiliently urge a sheet overlying said face into sealing contact therewith and permit movement of said sheet disposed between said face and said clamping means; means for applying vacuum to said mold face through said conduit means when it reaches a subsequent predetermined station of turret rotation to form said diaphragm, mechanical means conforming with said mold face for augmenting the forming of said diaphragm after the application of vacuum; means for releasing said vacuum and for releasing said clamping means at a still subsequent predetermined station after the diaphragm has been cured; and means for heating said mold to a temperature sufficient to cure said sheet.

7. A system for the precision molding of diaphragms from a sheet of yieldable, impermeable diaphragm membrane material comprising a plurality of suction molds, each having an upward mold face defining the shape of said diaphragm, said mold face being adapted to receive said sheet superimposed thereon, and said mold having conduit means for transmitting downward suction to various points on said face; a plurality of releasable clamping means, each of said suction molds being associated with one of said clamping means, each of said clamping means being positioned above its associated suction mold including means for moving said clamping means to a lowered position wherein it cooperates with portions of the face of its associated suction mold to releasably seal said sheet over said face at a predetermined station, said clamping means having a clamping surface for contacting said sheet and pressing same into sealing contact with said portions of said face, said clamping surface having substantially the same shape as said portions of said face; means for resiliently urging said clamping means when in its lowered position toward said face so as to resiliently urge a sheet overlying said face into sealing contact therewith and permit movement of said sheet disposed between said face and said clamping means; means for applying vacuum to said mold face through said conduit means to hold said sheet in conformance with said mold face to form said diaphragm; means for releasing said vacuum and for releasing said clamping means after the diaphragm has been cured; means for heating said mold to a temperature sufficient to cure said sheet; and means for sequentially actuating said releasable clamping means to first releasably seal said sheet of said face, said means for applying vacuum to next apply vacuum to said mold face, and said means for releasing said vacuum and for releasing said clamping means to thereafter release said vacuum and release said clamping means.

References Cited by the Examiner
UNITED STATES PATENTS

| | | | |
|---|---|---|---|
| 1,497,592 | 6/24 | Roberts | 18—19 |
| 1,654,647 | 1/28 | Heist | 18—19 |
| 2,814,077 | 11/57 | Moncrief | 18—35 |
| 2,902,718 | 9/59 | Martelli et al. | 18—19 |
| 3,069,725 | 12/62 | Root | 18—20 |
| 3,091,808 | 6/63 | Dakin | 18—19 |

MICHAEL V. BRINDISI, *Primary Examiner.*
NEDWIN BERGER, *Examiner.*